United States Patent Office 3,376,188
Patented Apr. 2, 1968

3,376,188
TERPOLYMER COMPOSITIONS AND PROCESS
OF PRODUCING SAME
Robert E. Clayton and Byron M. Vanderbilt, Westfield, N.J., assignors to Esso Research and Engineering Company, a corporation of Delaware
No Drawing. Filed Jan. 4, 1965, Ser. No. 423,372
12 Claims. (Cl. 161—193)

ABSTRACT OF THE DISCLOSURE

Natural or synthetic rubbers are reinforced with siliceous materials such as fillers or glass fibers. The siliceous materials are first treated with an organosilane and thereafter with an elastomeric terpolymer of ethylene, a higher alpha olefin and a diolefin; the terpolymer-coated siliceous materials are then cured while in contact with the rubber to be reinforced.

---

The present invention relates to novel terpolymer compositions and to the process of producing the same in which a plurality of reinforcing agents or reinforcing fillers of a siliceous nature are first treated or coated with silicon-containing compounds and optionally these so treated silicon-containing compounds are further treated with multiolefinic compounds of either liquid or solid character to enhance the adhesion of elastic terpolymers of ethylene to such siliceous materials.

In particular, glass fibers or finely divided silica fillers are treated with silanes or their partially or completely hydrolyzed derivatives and these so treated materials are further coated with or incorporated into elastomeric terpolymers of ethylene which may then be subsequently cured or partially cured using conventional sulfur or peroxide curing agents. The multiolefinic treatment may be intermediate to the silane and terpolymer steps or the multiolefins may be incorporated or admixed with the silane, the terpolymer, or both.

Intensive investigations have been undertaken in recent times to devise a satisfactory adhesion between glass fibers or silica fillers and rubbery or elastomeric compounds of either natural or synthetic nature. Numerous attempts have been made to obtain a satisfactory adhesion between such rubbers and silica or silicate reinforcing materials principally for the purpose of manufacturing rubber hoses, drive belts, or automobile and truck tires having higher tensile strength characteristics than has heretofore been thought to be possible. Particularly, automotive, truck and airplane tires are being constantly subjected to greater strains and stresses, to higher temperatures, and, in general, to much more severe conditions than has been the case in the past. For example, it is reported that tires employed on the landing wheels of supersonic jet aircraft may reach temperatures, while in the tire wells, approaching 400° F. Ordinarily, nylon or rayon reinforcing cords in tires subjected to such temperatures tend to weaken or melt. Thus a primary need in the industry today is for a satisfactory method of substituting glass cord in such tires for the synthetic fibers presently used.

Previous developments have uncovered satisfactory methods of bonding glass fibers to polyolefins such as polyethylene, polypropylene, or ethylene-propylene copolymer rubber so that glass reinforced polyolefins of high tensile strengths are now possible. However, such compositions, upon curing, tend to lose their thermoplastic and/or elastomeric properties; thus they are not entirely satisfactory for tire purposes even though the problem of strongly adhering such siliceous cords or fillers to them has now been satisfactorily attained. The present invention is directed to the successful adhesion of glass fibers or cords or finely divided silica fillers to coatings of terpolymer elastomers of ethylene, which terpolymers are used alone or laminated or admixed with rubbers conventionally used in tire treads and carcasses.

These terpolymers are old in the industry and are prepared by the interpolymerization of ethylene and another alpha monoolefin containing from 3 to 12 carbon atoms per molecule in association with a third nonconjugated $C_5$ to $C_{15}$ polyolefinic monomer. Specifically U.S. Patents 3,000,866, 3,093,621, and 2,933,480 disclose methods for the synthesis of such terpolymers and their teachings and disclosures are incorporated herein by reference.

At least two alpha monoolefins are employed such as admixtures of ethylene with propylene, ethylene with butene-1, ethylene with pentene-1, and the like. Mixtures of ethylene, propylene, and butene-1 or of ethylene, propylene, and pentene-1 may likewise be employed. In any event, these reaction feed admixtures have, as a third component, at least one nonconjugated $C_5$ to $C_{15}$ polyolefin such as dicyclopentadiene, 5-methylene-2-norbornene, 5-vinyl-2-norbornene, cyclooctadiene, 1,4-hexadiene, 2,4-dimethyl-2,7-octadiene, 11-ethyl-1,11-tridecadiene, or tetrahydroindene. A preferred terpolymer is prepared from ethylene, propylene, and 5-methylene-2-norbornene.

In general, the ethylene content of these terpolymers will range from about 20% to about 75% by wt. Terpolymers containing more than this amount of ethylene tend to be stiff and nonelastomeric. The concentration of propylene or other higher alpha monoolefin ranges, in general, from about 15% to about 75% by wt. The nonconjugated diolefin monomer, i.e., the third component in the reaction mixture, should be present in sufficient amount to impart sulfur curability, i.e., at least about 0.1% by wt. based on the terpolymer but the maximum amount should not be so high as to interfere seriously with the elastic character of the product or with the superior resistance of the product to attack by ozone and oxygen, i.e., the upper limit of the diolefin should not exceed 20% by wt. In most instances, the diolefin content will be between about 1 and about 5 wt. percent based on the terpolymer while the ethylene content will be between about 25 and about 60 wt. percent on the same basis, and the amount of the other alpha olefin monomer in total will range between about 20 and about 50 wt. percent on the same basis.

The siliceous materials, i.e., glass fibers, are initially treated at the time they are first drawn or gathered into strands with a suitable silane preferably in either partially or completely hydrolyzed form. This may be done by preparing an aqueous solution or an emulsion of the silane or effecting a partial hydrolysis of the silane with water followed by dissolving or suspending the same in benzene, toluene, hexane, heptane, or some other suitable hydrocarbon solvent or diluent. The aqueous solution or cement usually contains between about 0.1 and about 3.0 wt. percent of silane. The glass fibers as drawn or the finely divided silica fillers, having clean surfaces, are dipped, sprayed, or brushed with this mixture and are allowed to dry either by application of heat or by air drying. Coatings of 0.05 to 2.0% silane, based on the siliceous material, preferably about 0.5%, are thus provided.

The silanes useful in the instant invention are defined by the following general structure:

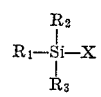

wherein $R_1$ is selected from the group consisting of alkenyl, aminoalkyl, epoxyalkyl, epoxyaryl, epoxyaralkyl, epoxycycloalkyl, mercaptoalkyl, acryloxyalkyl, and methacryloxyalkyl; X is selected from the group consisting of halogen, hydroxyl, and alkoxy; and $R_2$ and $R_3$ are each independently selected from the group consisting of $R_1$, X, and methyl. Specific suitable compounds are as follows:

gamma amino-propyl-triethoxysilane,
beta amino-ethyl-triethoxysilane,
gamma amino-propyl-trimethoxysilane,
gamma acryloxypropyl trimethoxysilane,
beta methacryloxyethyl trimethoxysilane,
gamma acryloxypropyl triethoxysilane,
gamma methacryloxypropyl trimethoxysilane,
gamma methacryloxypropyl dimethyl chlorsilane,
gamma (methacryloxyethoxy) propyl trimethoxysilane,
gamma methacryloxypropyl methyl diacetoxysilane,
vinyl trichlorosilane,
vinyl dimethylchlorosilane,
vinyl tris-2-methoxyethoxy silane,
divinyl dichlorosilane,
trivinyl chlorosilane,
divinyl diethoxysilane,
allyl trimethoxysilane, allyl trichlorosilane,
allyl tris-2-methoxyethoxysilane,
gamma glycidoxypropyl trimethoxysilane,
beta(3,4-epoxy cyclohexyl)ethyl trimethoxysilane,
beta gycidoxyethyl triethoxysilane,
beta(3,4-epoxy cyclohexyl)ethyl tri(methoxyethoxy) silane,
beta(3-epoxyethyl phenyl)ethyl trimethoxysilane,
beta(epoxyethyl)ethyl triethoxysilane,
4,5-epoxy-n-hexyl trimethoxysilane,
15,16-epoxy-n-hexadecyl trimethoxysilane,
3-methylene,7-methyl-6,7-epoxy octyl trimethoxysilane,
beta mercaptoethyl trimethoxysilane,
beta mercaptopropyl trimethoxysilane,
gamma mercaptopropyl trimethoxysilane,
beta(2-mercapto cyclohexyl)ethyl trimethoxysilane,
beta mercaptoethyl triethoxysilane,
gamma mercaptopropyl dimethyl methoxysilane,
beta mercaptoethyl triacetoxysilane, and the like. All of these silanes are believed to be effective upon being contacted even with minute amounts of water and are thus at least partially converted into the corresponding silanols which may also then be partially converted into their condensation polymers, the siloxanes. Condensation products of the hydrolyzed or partially hydrolyzed silane esters (siloxanes) as well as the silanols are usually believed to be present as a practical matter but they are all grouped together and defined as "silanes" for purposes of convenience herein and in the attached claims.

Either subsequent to or concurrently with the treatment of the siliceous material with the silane, one or more polyfunctional unsaturated compounds, either monomeric or polymeric in form and containing two or more terminal ethylenically unsaturated carbon to carbon linkages per molecule, may be applied to the siliceous materials. Good adhesion is obtained without the use of these compounds, hence their use is optional. The unsaturated linkages or functional groups act independently of each other; one group serving to couple with and chemically react with the functional groups contained in the silane and the other group serving as a chemical bond or coupling agent for the subsequently applied terpolymers. This latter bond is believed to be consummated upon the curing of the terpolymer as more fully hereinafter described. The term "polyunsaturated compound" as employed in this specification and accompanying claims is intended to have the above stated definition. Typical compounds which may be employed are the polyvinyl monomeric compounds, the polyisopropenyl monomeric compounds, the acrylic and methacrylic acid esters of polyhydric alcohols, unsaturated polyesters such as the maleic or fumaric anhydride esters of polyhydric alcohols, polymeric diolefins derived from the conventional 1,2-type emulsion polymerization of conjugated $C_4$ to $C_6$ diolefins such as normally liquid polybutadiene produced by either metallic sodium or alkyl lithium catalysis, and the normally liquid or sodium copolymeric materials derived from similar 1,2-type polymerizations of conjugated $C_4$ to $C_6$ diolefins with monovinyl substituted mononuclear aromatic compounds, for example, the copolymerizate of butadiene-styrene or vinyl toluene as produced by conventional sodium or butyl lithium polymerization or the butadiene-methyl methacrylate copolymers, and the above mentioned normally liquid polybutadiene grafted with styrene with the aid of a peroxide catalysis. In this last mentioned case, a sodium catalyzed prepolymerization of one monomer, for example, butadiene, is first carried out. This is followed by a further peroxide polymerization or grafting of the second monomer, for example, styrene, thereon. The last mentioned materials range from normally liquid when using up to about 15% styrene, to tacky solids when using from 15 to 25% styrene, to dry solids when using styrene amounts above 25%, based on the total reactant monomers. All of the herein described polyunsaturated polymers are characterized by being predominantly of the 1,2-type, that is, having pendant vinyl groups attached to longer chains. The number average molecular weight ranges from about 1,000 to about 15,000. They are generally not elastomeric in nature but are resinous. These polymers can be prepared in accordance with the exemplary processes outlined in U.S. Patents 2,762,851 and 3,097,108 which disclosures are incorporated herein by reference. The butadiene-styrene copolymers are preferred.

The polyvinyl compounds within the purview of this invention are those monomers which can be represented by the following structural formula:

wherein $R_1$, $R_2$, $R_3$, and $R_4$ are each independently selected from the group consisting of hydrogen, halogen, alkyl, and vinyl; and Ar is an aromatic nucleus selected from the group consisting of benzene, naphthalene, biphenyl, anthracene and phenanthrene. Specific examples are divinyl benzene, divinyl toluene, divinyl xylene, divinyl naphthalene, and trivinyl benzene. Divinyl benzene and trivinyl benzene are preferred.

The simplest member of an acrylic acid ester of a polyhydric alcohol, which is another type of polyunsaturated compound useful herein, has the following formula:

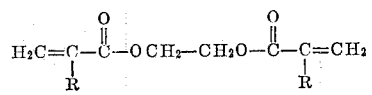

wherein R is selected from the group consisting of hydrogen, halogen, methyl and ethyl. Suitable acids include methacrylic, acrylic, alpha-chloroacrylic, and alpha-bromoacrylic acid. Polyhydric alcohols within the purview of this invention include ethylene glycol, diethylene glycol, propylene glycol-1,2, propylene glycol-1,3, the butanediols, glycerol, 1,1,1-trimethylol propane, and pentaerythritol. The preferred compounds of this class are the dimethacrylate ester of ethylene glycol, the trimethacrylate ester of trimethylol propane, and the tetramethacrylate ester of pentaerythritol.

A curative agent may also be incorporated at this stage, along with the polyunsaturated compound, within the range of 0.5 to 10 parts per hundred (php), preferably 2 to 4 php. The curative is advantageously a free radical organic peroxide type, such as the alkyl, aryl, and aralkyl peroxides, e.g., 2,5-dimethyl-2,5-di(t-butyl peroxy)hexyne-3, 2,5-dimethyl-2,5-di(t-butyl peroxy) hexane, dicumyl peroxide and ditertiary butyl peroxide, alkyl perester peroxides, e.g., ditertiary butyl diperphthalate and tertiary butyl perbenzoate; benzoyl peroxide and mixtures thereof. Any of the organic peroxides capable of generating free radicals can be used. The same curing agents, used in the same manner, are also admixed with the terpolymer.

A multiplicity of glass monofilaments may be gathered and formed into a strand with or without twisting. Multiple strands may be wound into cords. Generally, a coating of terpolymer placed upon the glass filaments or strands treated with silane and polyunsaturated compound may be made by dipping, brushing, or spraying latices or cements of the terpolymer with or without the presence of curing agents, or layers of terpolymer compounded with curing agents may be press cured and thus adhered to glass cloth so treated. After this coating of terpolymer is completed and the solvent or vehicle is separated from it either by heat volatilization or by air drying, the cords may be partially cured or left in an uncured condition. These coated filaments, strands, or cords in the form of cloth or cord are in condition for use by the rubber industry and may then be incorporated into a matrix of natural or synthetic rubber such as GR-S, butyl rubber or polybutadiene rubber, or any of the conventional and commercially available synthetic rubbers and while the so treated glass cords or fabrics are in contact with these rubbers, a final and complete curing operation using the conventional curing agents for the particular rubber used may be effected using conventional temperatures and curing times and using conventional antioxidants, sulfur-containing curing aids, peroxide, curing aids, scorch inhibitors, and the like.

The curing of the final rubber bonded to the treated glass fibers or siliceous fillers as well as the curing of the terpolymer serving as the outer coating on the glass fibers or silica fillers may be either a sulfur curing system or a peroxide curing system. A sulfur type curing system is used where a substituted alkyl silane has initially been employed and a peroxide system is used where an unsaturated silane has been initially employed. The polyunsaturated compounds of either monomeric or polymeric form are beneficial for improving adhesion of siliceous surfaces to terpolymer using the unsaturated silane-peroxide system. In cases where terpolymer is adhered to siliceous surfaces using the substituted alkyl silane-sulfur system, the polyunsaturated compound may or may not markedly improve the adhesion but, in any event, the polymeric polyunsaturated compounds are much preferred over the monomeric compounds which, in fact, do not appear to alter the adhesion characteristics either adversely or beneficially. Also the use of the polymeric compounds is preferred over the use of the monomeric compounds regardless of the system employed for they serve as glass fiber sizings and do not readily volatilize or evaporate at the drying and/or curing temperatures employed. Conventional curing temperatures range between about 250° and about 380° F. and curing times range between about 1 minute and about 2 hours depending, of course, upon the particular type of curing agent employed and the particular type of rubber with which the terpolymer-treated siliceous materials are associated. Preferably curing temperatures range between about 280° and about 330° F. and curing times between about 5 minutes and about 1 hour. Shorter times and lower temperatures will result in partial cures where these are desired. Terpolymers, of course, may be bonded to the terpolymer coated siliceous materials in which case a particular advantageous curative system involves the use of 0.5 part of dicumyl peroxide per 100 parts of polymer by weight, a curing time of between about 5 minutes and about 2 hours, and a temperature ranging between about 290° and about 330° F.

Another system involves the use of sulfur, zinc oxide with or without magnesium oxide, stearic acid, conventional curing aids such as tetramethyl thiuram disulfide and/or mercaptobenzothiazole with aging inhibitors, and plasticizers such as hydrocarbon plasticizing oils. An example of such oils is lubricating oil known in the trade as Necton 60 which is essentially a paraffinic lubricating oil containing about 22 wt. percent of aromatics, has an aniline point of about 216° F., and a viscosity of about 490 SSU at 100° F. and 57.3 SSU at 210° F. Curing methods involve the placing of the compounded or reinforced terpolymer coated siliceous materials in association with either natural or synthetic rubbers in a press mold at a temperature of 250–400° F. for between about 1 and about 180 minutes using a pressure of 50 to 1,500 p.s.i.. No superatmospheric pressure is required. However, if a partial curing of only the terpolymer coated glass fibers, strands, or cords is intended, the curing temperature will be be between about 250° F. and about 300° F. for from about 1 minute to about 10 minutes.

Various forms of siliceous materials may be employed. The following items are within the broad definition of such materials: glass fibers, glass flakes, glass plates, ceramics, porcelain, quartz, and finely divided silica pigments and fillers used in rubber compounding, e.g., ground quartz, fumed silica, precipitated hydrated silica and clays such as kaolin, etc. Finely divided silicas of 0.022 to 10 microns average particle size are particularly useful as fillers. Glass fibers include yarns, rovings, strands, reinforcing mats, staple yarns, woven fabrics, woven rovings, cords, and chopped rovings.

Solutions or emulsions of the silanes alone or admixed with polyfunctional compounds may be employed for contacting the siliceous surfaces such as finely divided silica fillers or multiple or single glass fibers. It is convenient and practical, however, to include in the silane emulsion or cement a small amount of a free radical peroxide curing catalyst, i.e., 0.5 to 3.0 wt. percent, and to include from 1 to 10% of the liquid (emulsion) of the polyfunctional hydrocarbon liquid or solid monomers or resinous polymers which act as coupling agents to aid in the ultimate bonding of the terpolymers to the siliceous surfaces. Any suitable emulsifying agent, for example, of the non-ionic type such as a polyethylene oxide condensate of nonyl phenol may be used. A sequence of dipping baths or applicator felt rollers, each containing one or more of the aforementioned three components (silane, polyfunctional compound, peroxide), may be used sequentially for treating the siliceous surfaces (glass fibers, for example) and the terpolymers may likewise be admixed (compounded) as by use of a Banbury mixing operation with peroxide, solid or liquid resinous hydrocarbon coupling agents and/or the so treated siliceous surfaces may be dipped, sprayed, or brushed with terpolymer cement without regard to whether or not the siliceous surfaces were treated only with the silanes or additionally with the peroxide and/or polyfunctional coupling compounds. From about 1 to 30% by wt. concentration of the terpolymers may be made into cements or emulsions or placed in like amount directly into the treating baths for the siliceous materials. Glass fiber monofilaments as strands are subjected to the aforementioned treating baths, heat or air dried, and then plied and twisted into cords which find special utility in the manufacture of reinforced belts, hose and tires, especially where the terpolymer (ethylene-propylene-methylene norbornene rubbery terpolymer) is to be adhered to the so treated and formed fiber glass cords.

The compounded terpolymer and silane finished glass or silica may be contiguously placed in conventional vulcanizing equipment, e.g., a press or autoclave, or in the case of silica filler, said filler is mixed into the terpolymer on a mill or in a Banbury mixer, and then heated at a temperature between 250° and 400° F., preferably 300° to 330° F. for 0.5 to 180 minutes, preferably 10 to 60 minutes, and cured, under pressure, of about 5 to about 1,500 p.s.i.g., preferably 50 to 600 p.s.i.g.

Accordingly, an end product is formed in which there is a strong chemical bond between the siliceous surfaces, e.g., glass fibers or silica filler particles, and the terpolymer. This unitary product has the following utility: tire carcass, reinforced hose, reinforced belting, rubber sheeting or electrical insulation prepared from the rubbery copolymers.

The following examples are submitted to illustrate but not limit this invention. Unless otherwise indicated, all parts and percentages in the specification are based upon weight.

EXAMPLE 1

Glass cloth (HG 28/112), which is a heat cleaned fabric of close mesh taffeta weave, was immersed in an aqueous solution prepared by mixing 28 grams of gamma aminopropyl triethoxysilane in 1,972 cc. of water. After immersion in this solution for 1 minute, the treated glass cloth was dried in air.

A terpolymer of 65 wt. percent ethylene, 33 wt. percent propylene, and 2 wt. percent methylene norbornene, having a Mooney viscosity of 55 (ML 4 minutes at 212° F.) and an intrinsic viscosity of 2.27 was compounded in accordance with the following recipe:

|  | Parts by wt. |
|---|---|
| Terpolymer | 100 |
| Semi-reinforcing furnace black | 60 |
| Zinc oxide | 5 |
| Magnesium oxide | 3 |
| Stearic acid | 1 |
| Sulfur | 1.5 |
| Tetramethyl thiuram disulfide | 1.5 |
| Mercaptobenzothiazole | 0.5 |
| Necton 60 [1] | 10.0 |

[1] Petroleum oil having following inspection:
Viscosity:
SSU/100° F. _____ 490
SSU/210° F. _____ 57.3
Aniline point, ° F. _____ 216
Specific gravity/60° F. _____ 0.899
Saturates, wt. percent _____ 78.3
Aromatics, wt. percent _____ 20.8
Polar materials, wt. percent _____ 0.9

Adhesion laminate specimens were then prepared as follows: The silane treated glass cloth was sandwiched between 2 layers of the compounded terpolymer and this assembly in turn was sandwiched between two layers of canvas for the purpose of backing. A piece of Mylar film (polyethylene terephthalate) was inserted at one end of the sample between the rubber and glass fabric to provide an opening for the start of a subsequent adhesion test. The sample was then press cured 15 minutes at 307° F. under 500 p.s.i. A 1″ wide specimen was cut out of the sample for strip adhesion test which was run on an Instron Tester at a jaw separation rate of 2″ per minute. The force required to separate the rubber from the glass was 23.5 lbs. per inch of width.

In a similar experiment which was identical to that described above but in which the glass fabric was not treated with any silane, the strip adhesion test showed a required force of separation of only 3 lbs. per inch of width.

EXAMPLE 2

The same glass cloth as described in Example 1 was employed but it was treated in a variety of ways as follows:

(A) With 1 wt. percent aqueous solution of hydrolyzed vinyl tris-(2-methoxyethoxy)silane and was dried in air at ambient temperature and was then further dried for ½-hour at 212° F.

(B) The glass cloth from (A) was immersed for about 1 minute in a 4 wt. percent toluene solution of 75 mole percent butadiene-25 mole percent styrene copolymer resin of which approximately 80% of its unsaturation is of the 1,2- or vinyl type. The solution also contained 0.08 wt. percent of dicumyl peroxide and 0.08 wt. percent of 2,5-dimethyl-2,5-di(tertiary butyl peroxy)hexane (Lupersol-101). The resin treated cloth was then air dried at room temperature and then dried for 10 minutes at 200° F.

(C) Untreated cloth was immersed for about 1 minute in a 1 wt. percent aqueous solution of hydrolyzed gamma methacryloxy-propyl trimethoxysilane. The cloth was dried in ambient air and further dried for ½-hour at 212° F. in an oven.

(D) Cloth from treatment (C) was treated with the same resin solution described in (B) and was dried in ambient air and further dried for ½-hour at 212° F. in an oven.

The terpolymer compound used in this example was as follows:

| | |
|---|---|
| Terpolymer [1] | 100 |
| Semi-reinforcing furnace black | 60 |
| Zinc oxide | 5 |
| Necton 60 [2] | 10 |
| Calcium stearate | 1 |
| Di-cup 40 HAF [3] | 2.5 |

[1] Ethylene, wt. percent _____ 60
Propylene, wt. percent _____ 36
Methylene norbornene, wt. percent _____ 4
Mooney viscosity (ML 4 minutes @ 212° F.) _____ 40
[2] Described in Example 1.
[3] 40% active ingredient dicumyl peroxide on HAF black.

Adhesion specimens were prepared and tested as described in Example 1 with the following results:

TABLE I

| Glass Fabric Treatment | Minutes of Cure at 307° F. | Adhesion, lb./in. |
|---|---|---|
| A | 20 | 24.5 |
|   | 30 | 18.5 |
| B | 20 | 35 |
|   | 30 | >49 |
| C | 20 | 31 |
|   | 30 | 39.5 |
| D | 20 | >39 |
|   | 30 | 42 |

This example illustrates that the terpolymer, when cured with a peroxide catalyst, can be strongly bonded to glass fibers if those fibers are first treated with an unsaturated silane. Additional bond adhesion strength, it was found, resulted where the silane treated glass was further treated with a polymeric resin. The advantage of the use of the polymeric resin, it was also found, persists using either a vinyl silane or a methacryloxy silane when the peroxide cure was employed.

A control sample identical with the preparation described in this example but in which the glass cloth was not treated with either a silane or a polymeric resin resulted in a test adhesion of only 3 lbs. per inch, the same as the control sample described in Example 1.

EXAMPLE 3

The same glass cloth as described in Example 1 was treated as follows:

(A) The HG 28/112 glass cloth was immersed for about 1 minute in a solution of 1 wt. percent hydrolyzed glycidoxypropyl-trimethoxysilane in a 0.1 wt. percent aqueous solution of acetic acid. After immersion the cloth was dried in air and then was placed in a vacuum oven for ½-hour at 150° F. with the pressure reduced to about 0.1 of an atmosphere.

(B) The HG 28/112 glass cloth was immersed for about 1 minute in a 1 wt. percent solution of hydrolyzed beta mercaptoethyl-trimethoxysilane in a 0.1 wt. percent aqueous solution of acetic acid. The immersed cloth was dried in air followed by ½-hour in an oven at 212° F.

The terpolymer of Example 2 was compounded according to the formula of Example 1 (sulfur cure system).

Adhesion specimens were prepared and tested as described in Example 1 with the following results:

TABLE II

| Glass Fabric Treatment | Minutes of Cure at 307° F. | Adhesion, lb./in. |
|---|---|---|
| A | 40 | 17 |
|   | 60 | 14 |
| B | 40 | 13 |
|   | 60 | 15 |

This example illustrates that the terpolymer can be bonded to glass fibers that have been treated with an epoxysilane or with a mercaptosilane.

A control sample identical with the preparation described in this example but in which the glass cloth was not treated with a silane resulted in a test adhesion of only 3 lbs. per inch, the same as the control samples described in Examples 1 and 2.

Having now set forth the general nature and specific embodiments of the present invention, the true scope of the invention is now particularly pointed out in the appended claims.

What is claimed is:

1. A process for adhering a siliceous reinforcing agent to an elastomeric terpolymer of ethylene, at least one other alpha-monoolefin and a nonconjugated $C_5$–$C_{15}$ polyolefin monomer which comprises the steps of:
    (a) treating said reinforcing agent with a silicon-containing compound selected from the group consisting of a silane, the partially hydrolyzed form of said silane and the fully hydrolyzed form of said silane, wherein said silane has the formula:

wherein $R_1$ is selected from the group consisting of alkenyl, aminoalkyl, epoxyalkyl, epoxyaryl, epoxyaralkyl, epoxycycloalkyl, mercaptoalkyl, acryloxyalkyl, and methacryloxyalkyl, $R_2$ and $R_3$ are each independently selected from the group consisting of $R_1$, X and methyl, and X is selected from the group consisting of halogen, hydroxy and alkoxy;
    (b) contacting the treated reinforcing agent with said terpolymer containing at least one curing agent; and
    (c) at least partially curing the terpolymer-reinforcing agent composite by heating at a temperature in the range of about 250° F. to about 380° F.

2. A process as in claim 1 in which the terpolymer is formed by the interpolymerization of ethylene, propylene and methylene norbornene.

3. A process as in claim 1 wherein the siliceous reinforcing agent is, concurrently with its treatment with said silicon-containing compound, treated with a polyunsaturated compound selected from the group consisting of polyvinyl aryl monomers, acrylic acid esters of polyhydric alcohols, methacrylic acid esters of polyhydric alcohols, unsaturated polyesters of unsaturated dicarboxylic acids and anhydrides with polyhydric alcohols, normally liquid and solid hydrocarbon polymeric compounds, obtained by the 1,2-type polymerization of $C_4$ to $C_6$ conjugated diolefins and obtained by the 1,2-type copolymerization of $C_4$ to $C_6$ conjugated diolefin with a monovinyl substituted mononuclear aromatic compound, having a molecular weight of 15,000 and below and containing at least 50% of the 1,2-type (vinyl) unsaturation therein.

4. A process as in claim 1 wherein the siliceous reinforcing agent is, subsequent to its treatment with said silicon-containing compound, treated with a polyunsaturated compound selected from the group consisting of polyvinyl aryl monomers, acrylic acid esters of polyhydric alcohols, methacrylic acid esters of polyhydric alcohols, unsaturated polyesters of unsaturated dicarboxylic acids and anhydrides with polyhydric alcohols, normally liquid and solid hydrocarbon polymeric compounds, obtained by the 1,2-type polymerization of $C_4$ to $C_6$ conjugated diolefins and obtained by the 1,2-type copolymerization of $C_4$ to $C_6$ conjugated diolefin with a monovinyl substituted mononuclear aromatic compound, having a molecular weight of 15,000 and below and containing at least 50% of the 1,2-type (vinyl) unsaturation therein.

5. A process as in claim 1 wherein the siliceous reinforcing agent is glass fibers.

6. A process as in claim 1 wherein the curing agent is a sulfur curing system and wherein the silane is a substituted saturated hydrocarbon silane.

7. A process as in claim 1 wherein the curing agent is a peroxide curing system and the silane employed is an unsaturated silane.

8. A terpolymer-siliceous reinforcing agent composite prepared by the process according to claim 1.

9. A terpolymer-siliceous reinforcing agent composite prepared by the process according to claim 3.

10. A terpolymer-siliceous reinforcing agent composite prepared by the process according to claim 4.

11. A process for bonding siliceous reinforcing materials to a natural or synthetic rubber which comprises the steps of:
    (a) preparing terpolymer-siliceous reinforcing agent composite by the process according to claim 1;
    (b) contacting the terpolymer-siliceous reinforcing agent composite with a natural or synthetic rubber containing at least one curing agent for said natural or synthetic rubber; and
    (c) curing the composite from step (b) at a temperature in the range of 250° to 400° F.

12. The process of claim 11 wherein the reinforcing agent is glass fibers.

References Cited

UNITED STATES PATENTS

| 3,252,278 | 5/1966 | Marzocchi et al. | 61—193 |
| 3,306,800 | 2/1967 | Plueddemann | 161—193 |

ROBERT F. BURNETT, *Primary Examiner.*

ALEXANDER WYMAN, *Examiner.*

W. J. VAN BALEN, *Assistant Examiner.*